Patented Mar. 28, 1939

2,151,680

UNITED STATES PATENT OFFICE 2,151,680

TRI-(4-TERTIARY-ALKYL-1,2-PHENYLENE) PHOSPHATES

Edgar C. Britton and Clarence L. Moyle, Midland, Mich., assignors to The Dow Chemical Company, Midland, Mich., a corporation of Michigan No Drawing. Application March 28, 1938,
Serial No. 198,494

2 Claims. (Cl. 260—461)

This invention concerns certain new phosphoric acid esters, namely the tri-(4-tertiary-alkyl-1, 2-phenylene) phosphates having the general formula

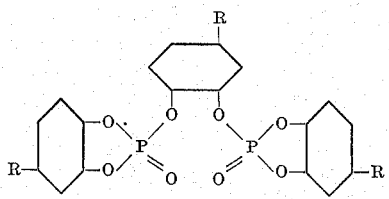

wherein R represents a tertiary alkyl group. These compounds possess the property of rendering cellulose ether solutions to which they are added relatively stable against change in viscosity when heated, and are also useful as plasticizers for cellulose ethers, cellulose esters, nitrocellulose, etc.

The new compounds are prepared by reacting a phosphorus oxyhalide with a 4-tertiary-alkyl-catechol, e. g. 4-tertiary-butyl-catechol, 4-tertiary-hexyl-catechol, etc., in the presence of an inert solvent. In carrying out the reaction, the 4-tertiary-alkyl-catechol is dissolved in an inert solvent such as chlorobenzene or toluene, after which approximately 0.66 molecular equivalent, or somewhat less, of a phosphorus oxyhalide, e. g. phosphorus oxychloride, phosphorus oxybromide, etc., is added gradually with stirring so as to obtain smooth and reasonably rapid reaction. After completing the addition, the mixture is heated at a temperature between 100° C. and 150° C. with continuous stirring for from 6 to 10 hours in order to assure complete reaction. Hydrogen chloride is evolved from the mixture during the reaction and may be collected as a valuable by-product. When the evolution of hydrogen chloride has ceased, the solvent is distilled from the mixture and the residual product is purified by distillation under reduced pressure.

The following example will illustrate one way in which the principle of the invention has been carried out but is not to be construed as limiting the same:

Example 748 grams (4.5 mols) of 4-tertiary-butyl-catechol was dissolved in 1000 grams of chlorobenzene at 100° C. While maintaining the temperature at 100° C., 153.4 grams (1 mol) of phosphorus oxychloride was added with stirring over a period of 4 hours. The temperature of the reactants was then raised from 100° C. to 145° C. over a period of 8 hours. At the end of this time approximately 3 mols of hydrogen chloride had been evolved, indicating that the reaction was complete. Chlorobenzene was removed by distillation at ordinary pressure, after which the excess 4-tertiary-butyl-catechol was distilled off under vacuum. Crude tri-(4-tertiary-butyl-1, 2-phenylene) phosphate remained behind and was purified by vacuum distillation. The product distilled at 335°–337° C. at 10 millimeters pressure and upon cooling to room temperature hardened to a pale brown, glass-like solid. It is quite deliquescent, dissolves in cold water, and is readily hydrolyzed by aqueous alkali or hot water. Tri-(4-tertiary-butyl-1, 2-phenylene) phosphate has the formula Other tri-(4-tertiary-alkyl-1, 2-phenylene) phosphates may be prepared by similar procedure. For example, a phosphorus oxyhalide may be reacted with 4-tertiary-amyl-catechol to produce tri-(4-tertiary-amyl-1, 2-phenylene) phosphate; with 4-tertiary-heptyl-catechol to produce tri-(4-tertiary-heptyl-1, 2-phenylene) phosphate; with 4-tertiary-octyl-catechol to produce tri-(4-tertiary-octyl-1, 2-phenylene) phosphate; etc.

Other modes of applying the principle of our invention may be employed instead of the one explained, change being made as regards the material employed, provided the products described in any of the following claims be thereby obtained.

We therefore particularly point out and distinctly claim as our invention:

1. A tri-(4-tertiary-alkyl-1, 2-phenylene) phosphate having the general formula
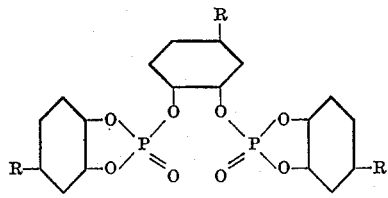
wherein R represents a tertiary alkyl group.
2. Tri-(4-tertiary-butyl-1, 2-phenylene) phosphate, a pale-brown, amorphous solid, distilling at approximately 333°–337° C. under 10 millimeters pressure, and having the formula
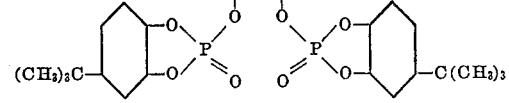
EDGAR C. BRITTON.
CLARENCE L. MOYLE.